United States Patent Office 3,420,854
Patented Jan. 7, 1969

3,420,854
CONVERSION OF ALKYLPHENOLS
TO BENZOFURANS
Phillip S. Landis, Woodbury, N.J., and Donald E. Boswell, Yardley, Pa., assignors to Mobil Oil Corporation, a corporation of New York
No Drawing. Filed Feb. 3, 1966, Ser. No. 524,866
U.S. Cl. 260—346.2   4 Claims
Int. Cl. C07d 5/26

ABSTRACT OF THE DISCLOSURE o-Alkylphenols are converted to benzofurans in high yield in contact with a crystalline aluminosilicate and carbonyl sulfide at 300–600° C. The aluminosilicate can be impregnated with a hydrogenation-dehydrogenation component, such as platinum.

---

This invention relates to the preparation of benzofurans. It is more particularly concerned with a vapor phase process for converting 2-alkylphenols to benzofuran.

As is well known to those familiar with the art, it has been proposed to convert alkylphenols, such as thymol, 2-isopropylphenol, and 2-ethylphenol, to the corresponding benzofurans, respectively 3,6-dimethylbenzofuran, 3-methylbenzofuran, and benzofuran. The catalysts used were chromium, chromium-copper, and chromium-copper on charcoal and on silica gel, in the temperature range of 540–625° C. In all cases the specificity for formation of the benzofurans was less than 20 percent and catalyst activity dropped rapidly with time.

It has now been found that benzofurans can be produced in high yields by a process that is simple and economically feasible. It has been discovered that benzofurans can be so produced by a process involving contacting a 2-alkylphenol with a crystalline aluminosilicate catalyst in the presence of carbonyl sulfide.

Accordingly, it is a broad object of this invention to provide an improved process for producing benzofuran and derivatives thereof. Another object is to provide an improved vapor phase catalytic process for producing benzofurans. A specific object is to provide a vapor phase process for producing benzofurans by contacting a 2-alkylphenol with a crystalline aluminosilicate catalyst in the presence of carbonyl sulfide. Other objects and advantages of this invention will become apparent to those skilled in the art, from the following detailed description.

This invention provides a method for producing benzofuran and substituted derivatives thereof that comprises contacting a phenol reactant having the formula:

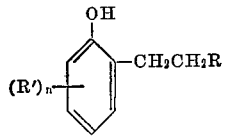

wherein R is hydrogen or lower alkyl ($C_1$–$C_4$), R' is selected from the group consisting of lower alkyl ($C_1$–$C_4$), aryl, halogen, cyano, and nitro, and $n$ is 0 to 3, and carbonyl sulfide with a catalyst comprising a synthetic crystalline aluminosilicate having a structure of rigid three-dimensional networks characterized by a uniform effective pore diameter between 6 and 15 Angstrom units.

The phenol compound reactant is a 2-alkylphenol having the aforedefined formula. As indicated above, the phenol compound reactant can contain one or more substituent groups on the benzene ring. Non-limiting examples of the phenol reactant are 2-ethylphenol; 2-butylphenol; 2-isopropylphenol; 2-(3-methylbutyl)phenol; 2 - (3,3 - dimethylbutyl)phenol; 2-hexylphenol; 2-ethyl-4-chlorophenol; 2-propyl-5-bromophenol; 2-hexyl-4,5-dichlorophenol; 2-ethyl-6-cyanophenol; and 2-isopropyl-5-nitrophenol. The 2-ethylphenols, which can have a substituent or substituents R' as aforedescribed are preferred phenol compound reactants.

The exact role played by carbonyl sulfide in the process of this invention has not been ascertained. It may be postulated, however, that it serves as a dehydrogenation agent. Other sulfur-containing compounds do not appear to be equivalent to carbonyl sulfide. Hydrogen sulfide, for example, was not effective. It is known, however, that elemental sulfur and carbon monoxide react, at temperatures above about 500° C.; to form carbonyl sulfide (see U.S. Patent No. 2,983,580). Accordingly, it is within the contemplation of this invention when operating at elevated temperatures to replace all or part of the carbonyl sulfide charge to the reactor with an equimolar mixture of elemental sulfur and carbon monoxide, thereby forming carbonyl sulfide in situ.

It appears that 2 moles of carbonyl sulfide per mole of phenol reactant are consumed in the reaction. Thus, it is desirable to use a molar excess of carbonyl sulfide. In general, the molar ratio of carbonyl sulfide to phenol reactant can be between 2:1 and 5:1.

The catalyst used in the process of this invention is comprised of a synthetic crystalline aluminosilicate having a structure of rigid three-dimensional networks characterized by a uniform effective pore diameter between 6 and 15 Angstrom units. These aluminosilicates are also known as zeolitic molecular sieves. The catalyst can be comprised entirely of synthetic aluminosilicate or it can be combined with metal oxides, such as silica and silica alumina, and a suitable binder, such as clay. The various types of aluminosilicates are well known. They are described in the following typical U.S. patents, to which reference is made, Nos. 3,140,251, 3,140,252, and 3,140,253. Zeolites X, Y and T are preferred.

It has also been found, within the contemplation of this invention, that selectivity is somewhat enhanced when the synthetic crystalline aluminosilicate is impregnated with a hydrogenation-dehydrogenation component, i.e., a metal, metal oxide, or metal sulfide. Reference is made to U.S. Patent No. 3,210,265 for a description of such impregnated aluminosilicates and of their preparation.

The process of this invention can be carried out batchwise, but it is more feasible to use a continuous operation. The temperature employed can be between about 300° C. and about 600° C. It is generally preferred to be operated between about 500° C. and about 600° C. The liquid hourly space velocity (LHSV-liquid volume phenol reactant charged per volume of catalyst per hour) will be between about 0.1 and about 20 and is, as is well known, correlative with the temperature. The process proceeds readily to good yields at atmospheric pressure, but subatmospheric or superatmospheric pressures can be used.

EXAMPLE 1

A series of runs was carried out at atmospheric pressure, using a catalyst bed of Zeolite 13X (Type X aluminosilicate having an average effective pore diameter of about 13 Angstrom units) heated to the desired run temperature. In each run, 2-ethylphenol was charged at an LHSV of 1.0 and carbonyl sulfide was charged in a molar ratio of 2-ethylphenol to carbonyl sulfide of 1:4.8. Pertinent data are shown in the following tabulation:

| Temp., °C. | Percent conversion | Percent phenol | Percent benzofuran | Ultimate yield [1] |
|---|---|---|---|---|
| 500 | 43 | 32 | 11 | 26 |
| 550 | 54 | 4 | 50 | 93 |
| 600 | 75 | 4 | 71 | 95 |

[1] Wt. percent yield benzofuran obtained by recycling unreacted 2-ethylphenol to extinction.

EXAMPLE 2

A series of runs was carried out, as described in Example 1, using various temperatures, except that LHSV was 0.5. Pertinent data are set forth in the following tabulation:

| Temp., °C. | Percent conversion | Percent phenol | Percent benzofuran | Ultimate yield [1] |
|---|---|---|---|---|
| 200 | 0.1 | 0.1 | 0 | 0 |
| 300 | 11 | 9 | 0.2 | 2 |
| 400 | 28 | 20 | 1 | 4 |
| 500 | 47 | 6 | 41 | 87 |
| 600 | 90 | 3 | 87 | 97 |

[1] Wt. percent yield benzofuran obtained by recycling unreacted 2-ethylphenol to extinction.

EXAMPLE 3

A series of runs was carried out, as described in Example 1, using various temperatures, except that the catalyst used was Zeolite 13X impregnated with 0.2 weight percent platinum metal. Pertinent data are set forth in the following tabulation:

| Temp., °C. | Percent conversion | Percent phenol | Percent benzofuran | Ultimate yield [1] |
|---|---|---|---|---|
| 200 | 1 | 1 | 0 | 0 |
| 300 | 6 | 4 | 2 | 33 |
| 400 | 6 | 3 | 3 | 50 |
| 500 | 33 | 2 | 31 | 94 |
| 600 | 74 | 2 | 72 | 97 |

[1] Wt. percent yield benzofuran obtained by recycling unreacted 2-ethylphenol to extinction.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for producing benzofuran and substituted derivatives thereof that comprises contacting a phenol reactant having the formula:

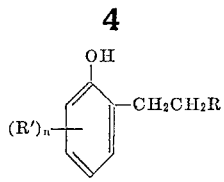

wherein R is selected from the group consisting of hydrogen and lower alkyl ($C_1$–$C_4$), R' is selected from the group consisting of lower alkyl ($C_1$–$C_4$), halogen, cyano, and nitro, and $n$ is 0 to 3, and carbonyl sulfide at a temperature between about 300° C. and about 600° C. with a catalyst comprising a synthetic crystalline aluminosilicate having a structure of rigid three-dimensional networks characterized by a uniform effective pore diameter between about 6 and about 15 Angstrom units.

2. The process defined in claim 1 wherein said phenol reactant is 2-ethylphenol.

3. The process defined in claim 1 wherein said aluminosilicate catalyst is impregnated with a hydrogenation-dehydrogenation component.

4. The process defined in claim 1 wherein said phenol reactant is 2-ethylphenol and said aluminosilicate catalyst is impregnated with platinum metal.

References Cited

UNITED STATES PATENTS 3,140,253    3/1964    Plank et al. _____ 208—120

FOREIGN PATENTS 684,736    4/1964    Canada.

OTHER REFERENCES

Hansch et al., Ind. & Eng. Chem., vol. 42 (1950), pp. 2114–7.

NICHOLAS S. RIZZO, *Primary Examiner.*

B. I. DENTZ, *Assistant Examiner.*